United States Patent
Khaleghi et al.

(10) Patent No.: US 6,704,328 B1
(45) Date of Patent: Mar. 9, 2004

(54) SIGNALLING SCHEME AND MESSAGING STRUCTURE TO SUPPORT THE SMOOTHING OF LARGE BIT RATE TRANSMISSIONS

(75) Inventors: Farideh Khaleghi, Ottawa (CA); Nimal G. Senarath, Nepean (CA); Geng Wu, Richardson, TX (US); Robert Matyas, Nepean (CA); Parsyna R. Larijani, Ottawa (CA); Mo-Han Fong, Verdun (CA)

(73) Assignee: Nortel Networks, Limited, St. Laurent (CA)

( * ) Notice: Subject to any disclaimer, the term of this patent is extended or adjusted under 35 U.S.C. 154(b) by 0 days.

(21) Appl. No.: 09/360,680

(22) Filed: Jul. 26, 1999

(51) Int. Cl.$^7$ ................................................. H04J 3/22
(52) U.S. Cl. ..................... 370/468; 370/329; 370/252; 370/437; 455/450
(58) Field of Search ................................ 370/329, 328, 370/441, 335, 342, 206, 252, 352–356, 401, 310.1, 310.2, 332, 437, 468; 709/202, 247; 704/223; 375/206, 295, 200, 130; 455/450, 552, 455, 442, 68, 67.11

(56) References Cited

U.S. PATENT DOCUMENTS

| | | | | |
|---|---|---|---|---|
| 5,103,459 A | * | 4/1992 | Gilhousen et al. | 370/206 |
| 5,442,625 A | * | 8/1995 | Gitlin et al. | 370/342 |
| 5,778,338 A | * | 7/1998 | Jacobs et al. | 704/223 |
| 5,864,682 A | * | 1/1999 | Porter et al. | 709/247 |
| 5,896,411 A | * | 4/1999 | Ali et al. | 375/130 |
| 6,069,883 A | * | 5/2000 | Ejzak et al. | 370/335 |
| 6,085,221 A | * | 7/2000 | Graf | 709/202 |
| 6,137,789 A | * | 10/2000 | Honkasalo | 370/342 |
| 6,453,151 B1 | * | 9/2002 | Kiang et al. | 455/67.11 |

* cited by examiner

Primary Examiner—John Pezzlo
(74) Attorney, Agent, or Firm—Barnes & Thornburg

(57) ABSTRACT

In a wireless communications system, after a high data rate user is admitted and a supplemental channel is assigned to the user, a control message is sent to a receiver to communicate for power ramp-up and ramp-down profiles. The control message contains parameters of a data rate, a starting time and a duration of time as group in assigned fields in the message which is provided by a control signal source. In response to the control message, a controller provides a rate controllable signal with reference to the parameters of the control message to a data encoder. A bursty input data stream is fed to a buffer. The data encoder withdraws the data from the buffer in response to the rate controllable signal. The bit rate transitions in the bursty input data stream are smoothed with reference to the parameters. There is provided an output data stream having smoother data rate transitions than the input data stream. It is possible to solve problems with 3G CDMA systems which have sudden interference changes resulting from the bursty nature of high-speed data transmissions.

15 Claims, 8 Drawing Sheets

SIGNALLING SCHEME AND MESSAGING STRUCTURE TO SUPPORT THE SMOOTHING OF LARGE BIT RATE TRANSMISSIONS

TECHNICAL FIELD

The present invention relates to communications systems in general and, more particularly, to a method and apparatus for smoothly transmitting bursty data in a wireless communications system and a corresponding signalling method.

BACKGROUND INFORMATION

Existing CDMA (code-division multiple access) systems based on TIA/EIA standard IS-95 support the transmission of digital information at rates of up to 9.6 Kbps or at most 14.4 Kbps per channel. However, these data rates are considered to be insufficient for supporting many emerging data transfer applications, including browsing of the World Wide Web, electronic mail, e-commerce, tele-medicine and the like. With the goal of providing greater flexibility in the delivery of data services while continuing to exploit the features and merits of a CDMA-based system, various North American, European and Japanese consortia have developed proposals for what has become known as third generation (3G) CDMA.

As a consequence of 3G CDMA being able to support a wide range of data rates, links having different data rates may vary considerably in the power they consume. For example, to maintain the same quality of service for a 384 Kbps link, approximately 16 dB more power is required than for a 9.6 Kbps link. (The latter is typical of the bit rate of a standard voice channel in both IS-95 and 3G CDMA, while the former is typical of the bit rate that has been proposed for use by high-speed data channels in 3G CDMA.) Thus, the abrupt start of a 384 Kbps transmission is roughly equivalent to the simultaneous origination of 40 voice calls.

The interference caused by establishing high-speed data connections depends on various factors, such as the locations of the users in a cell, the direction of communication (forward-link or reverse-link) and the cell loading. By way of illustration, let there be a high-speed link established between a first mobile unit and a base station in a cell C1. If a second mobile unit is also located in cell C1 and if the first mobile unit's high-speed connection is in the forward-link direction, then very little interference will be felt by the second mobile unit, due to mutual orthogonality of the signals transmitted by the base station in cell C1.

On the other hand, if the second mobile unit is located in a cell C2 which borders with cell C1 and if the first mobile unit's high-speed connection has been established in the forward-link direction, then factors such as the loading of cell C2 and the proximity of the second mobile unit to the boundary of cell C1 will determine the level of interference felt by the second mobile unit. This can range from very mild (when cell C2 is heavily loaded and the second mobile unit is far away from the boundary between cells C1 and C2) to very severe (when cell C2 has very few active calls and the second mobile unit is proximate the boundary between cells C1 and C2).

An increase in the interference felt by other users (e.g., the second mobile unit in the above example) results in a degradation in the quality of service of the connections established by those other users. Consequently, the transmitted power of the affected links will be increased using standard power control algorithms until an acceptable quality of service is again attained. However, the other users may not be able to increase their power levels quickly enough, which may result in frames being lost or delayed in the meantime. Specifically, if there is an overlay of the 2G and 3G systems, the users of the 2G system will suffer loss of a greater number of frames. Fast power control is not employed in 2G systems. The 2G users will require a longer time to respond to the increase in the interference level.

Furthermore, even if the other users are capable of raising their power levels quickly, a certain amount of time will elapse before stable power levels are arrived at by the various users. This is due to the fact that when link power is increased to satisfy any one user, interference will be caused to the remaining users, who then have to raise their respective link power, thereby affecting the user who originally required an increase in link power, and so on. This chain reaction continues until all users reach a stable power level but in the meantime, some users may experience a lower signal quality than required. Depending on the degree of burstiness of the high-speed data, such chain reactions may be initiated many times per second and thus the power levels may not be given a chance to converge.

Clearly, a development problem of the 3G CDMA systems is that of addressing the sudden interference changes resulting from the bursty nature of high-speed data transmissions.

SUMMARY OF THE INVENTION

It is an object of the present invention to provide an improved method and apparatus for smoothly transmitting bursty data in a wireless communications system.

According to one aspect of the present invention, there is provided a method of smoothing bit rate transitions in a bursty input data stream arid providing an output data stream having smoother data rate transitions than the input data stream, the method comprising the steps of: receiving the input data stream in data store means; providing a rate control signal with reference to a control message containing system parameters; and withdrawing the data from the data store means at a rate determined by the rate control signal.

According to another aspect of the present invention, there is provided a transmission system comprising: data source means for providing an input data stream comprising data bursts; data store means for receiving the input data stream; control means for providing a rate control signal in responsive to a control message; and processing means for withdrawing data from the data store means at a rate indicated by the rate control signal, so as to produce an output data stream which is less bursty than the input data stream.

According to another aspect of the present invention, there is provided a wireless-link communications system comprising signal transmitter and receiver, the transmitter comprising: data source means for providing an input data stream comprising data bursts; data store means for receiving the input data stream; control means for providing a rate control signal in responsive to a control message; processing means for withdrawing data from the data store means at a rate indicated by the rate control signal, so as to produce an output data stream which is less bursty than the input data stream; and transmission means for transmitting a signal in response to the output data stream to the receiver over a wireless link, the receiver comprising: receiving means for the signal from the transmitter; reproducing means for reproducing the data from the signal received by the receiving means.

For example, the control message is sent to a receiver to communicate for power ramp-up and ramp-down profiles. The control message contains a plurality of assignments. Each assignment comprises a plurality of fields, each field having a group of parameter data. The parameter data includes rate and time period information. The rate of the rate control signal is varied in response to the rate information of the parameter data. The rate of the rate control signal is set during the time period determined by the time period information of the parameter data. The data is withdrawn from the data store means at the rate set in response to the rate control signal. Smoothing the bursty data stream reduces the degradation of service quality to other users of the system upon establishing the bursty connection. The problems related to convergence of power levels across the entire system are practically eliminated, as well.

The transmission system may comprise transmitter means for scaling the output of the processing means with reference to a variable power of the rate control signal provided by the control means. In a case where the transmission system is implemented in a wireless communications system, after a high data rate user is admitted and a supplemental channel is assigned to the user, a control message is sent to a receiver to communicate for power ramp-up and ramp-down profiles, the control message containing a plurality of assignments.

Power amplifier requirements in the transmitter means may be relaxed, which can prevent outages of the high-speed link itself. Also, since there are fewer abrupt changes in the output rate, there will be fewer abrupt changes in the induced interference, leading to a lower percentage of call drops which are retained and hence the capacity is increased.

The transmission system may be part of either a mobile unit or a base station.

For a given final data rate, transmitting only one message containing all the intermediate data rates and their duration decreases the overhead thereby increasing the overall capacity of the system. Also, the data rate changes can be done as quickly as possible to avoid unnecessary delay in high data rate transmission.

BRIEF DESCRIPTION OF THE DRAWINGS

These and other aspects and features of the present invention will become apparent to those of ordinary skill in the art upon review of the following description of specific embodiments of the present invention in conjunction with the accompanying drawings, in which.

DETAILED DESCRIPTION

Multiple Assignment Signalling

The present invention is directed to multiple assignment signalling for ramp-up and ramp-down of the supplemental channels in 3G CDMA.

In 3G CDMA, the data rate of the data users can be as high as 384 Kbps which requires a transmitted power equivalent to approximately 40 voice users. Although the forward-link channels in one cell are orthogonal, the addition of a high data rate user can introduce a large and abrupt amount of interference to the neighboring cells. The power control is not fast enough to cope with such an abrupt change and some calls may be dropped as a result. A possible way to avoid this problem is to start the power level at the voice level and to ramp up where the step sizes are equivalent to a voice user power. The start-up power and the step size are chosen to be even larger as long as the power control is fast enough to cope with the added inter-cell interference. Obviously, the frames sent at the lower powers are not going to be received error free. Knowing this, some dummy data can be sent by these frame, the power of which is below the estimated required power. It is possible that this information should be communicated to the mobile in order to avoid the unnecessary undesirable reactions.

Another more involved solution is described in the following. If the data rate can change during a call session, then the starting data rate is chosen so that the frames are likely to be received error-free at the starting power. The data rate increases as the power is increased. The data rate cannot be increased by less than of a factor of two, by changing the spreading codes (Walsh codes). However, the ramp-up could be made by doubling the power and keeping the same data rate in situations that doubling the data rate requires power increases equivalent to more than one voice user. Note that doubling the data rate from 76.8 to 153.6 Kbps is equivalent to the addition of 8 voice users. The messaging structure should be changed to handle the described ramp-up and equivalently the ramp-down, for following reasons:

(i) the data rate profile can be pre-assigned;
(ii) the necessary signalling uses a big chunk of the system capacity and the delay associated with the signalling control packets lengthen the call session; and
(iii) the data rate changes can be done as quickly as possible to avoid unnecessary delay in high data rate transmission.

A multi-assignment protocol can be added to the standard to address that problem.

Signalling

For signalling, parameters in the ESCAM message to use for the interference smoothing are, for example:

A 'Num. of Record" field to indicate how many SCH assignments associated with a particular FOR_SCH_ID or REV_SCH_ID.

Each assignment will have its associated fields: Start Time, Duration, Data Rate (& Walsh code for the case of forward-link).

Embodiment

Embodiments of the present invention will now be described by way of example with reference to the accompanying drawings.

Figure 1A:
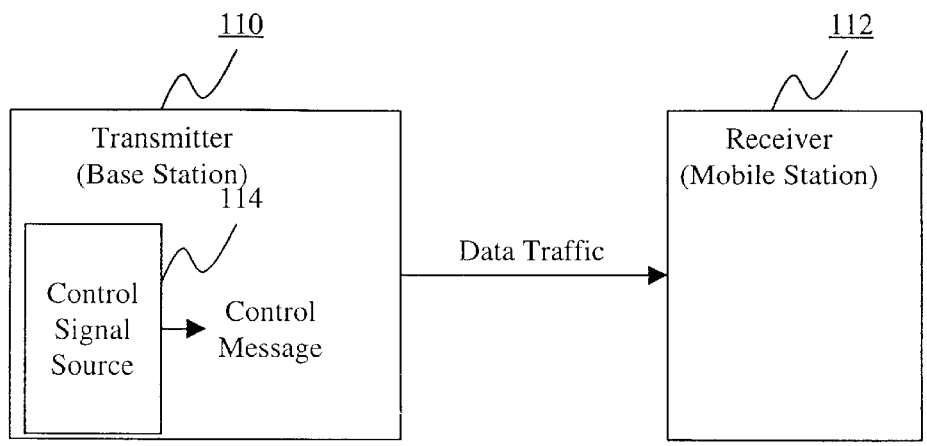
FIGS. 1A, 1B and 1C illustrate wireless-link communications systems, each system including base and mobile stations as a transmitter and a receiver.
Figure 1B:
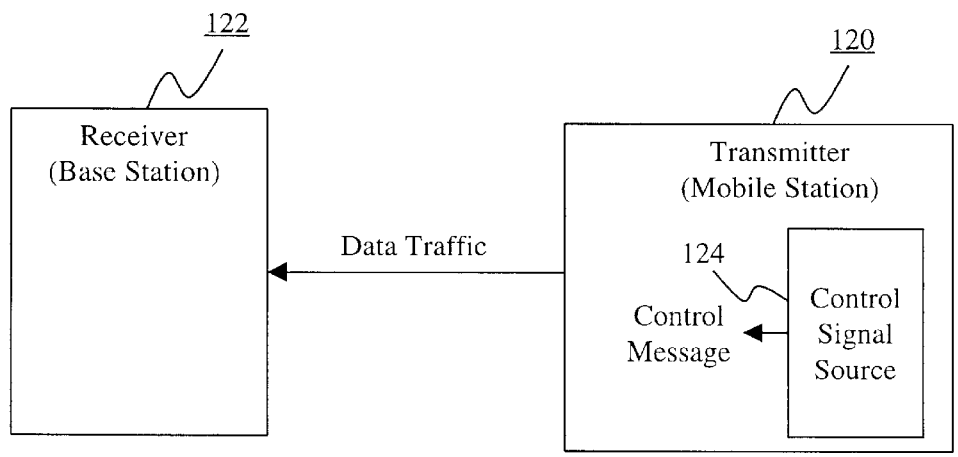
Figure 1C:
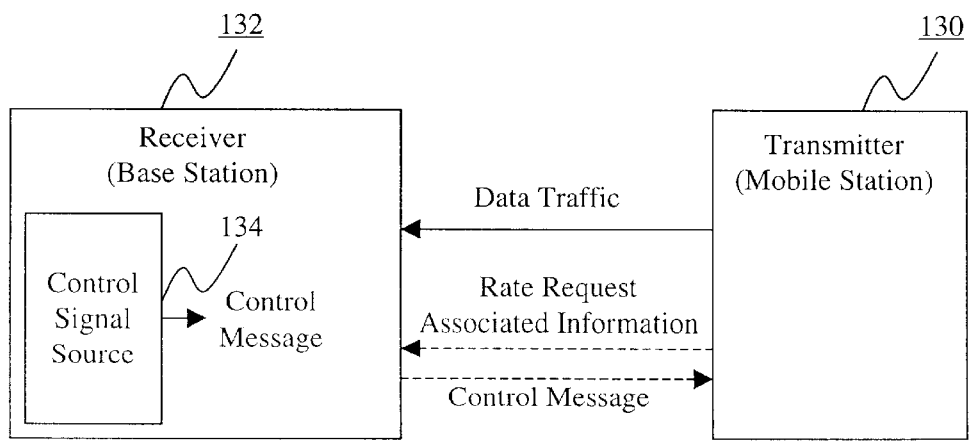

FIGS. 1A–C show CDMA communications systems according to embodiments of the present invention.

FIG. 1A shows a base station 110 and a mobile station 112 as a transmitter and a receiver, respectively, in a forward-link scenario. The base station 110 knows a data profile and it is provided as a control message by a control signal source 114. The control message is transmitted via the control channel to the receiver (or the mobile station 112).

FIG. 1B shows a mobile station 120 and a base station 122 as a transmitter and a receiver, respectively, in a reverse-link scenario. The mobile station 120 knows a data profile and it is provided as a control message by a control signal source 124. The control message is transmitted via the control channel to the receiver (or the base station 122).

FIG. 1C shows a mobile station 130 and a base station 132 as a transmitter and a receiver, respectively, in a reverse-link scenario. Once rate request associated information is received by the base station 132 from the mobile station 130, the base station 132 will access a control signal source 134 which provides control messages of data profiles. The base station 132 knows the profile and sends the profile to the mobile station 130, so that the mobile station 130 becomes aware of how to transmit the data. The mobile station 130 uses the information to secure the data to the receiver (or the base station 132). If a blind detection is implemented at the receiver, no control message will be needed to be communicate between the transmitter-receiver pair.

Figure 2:
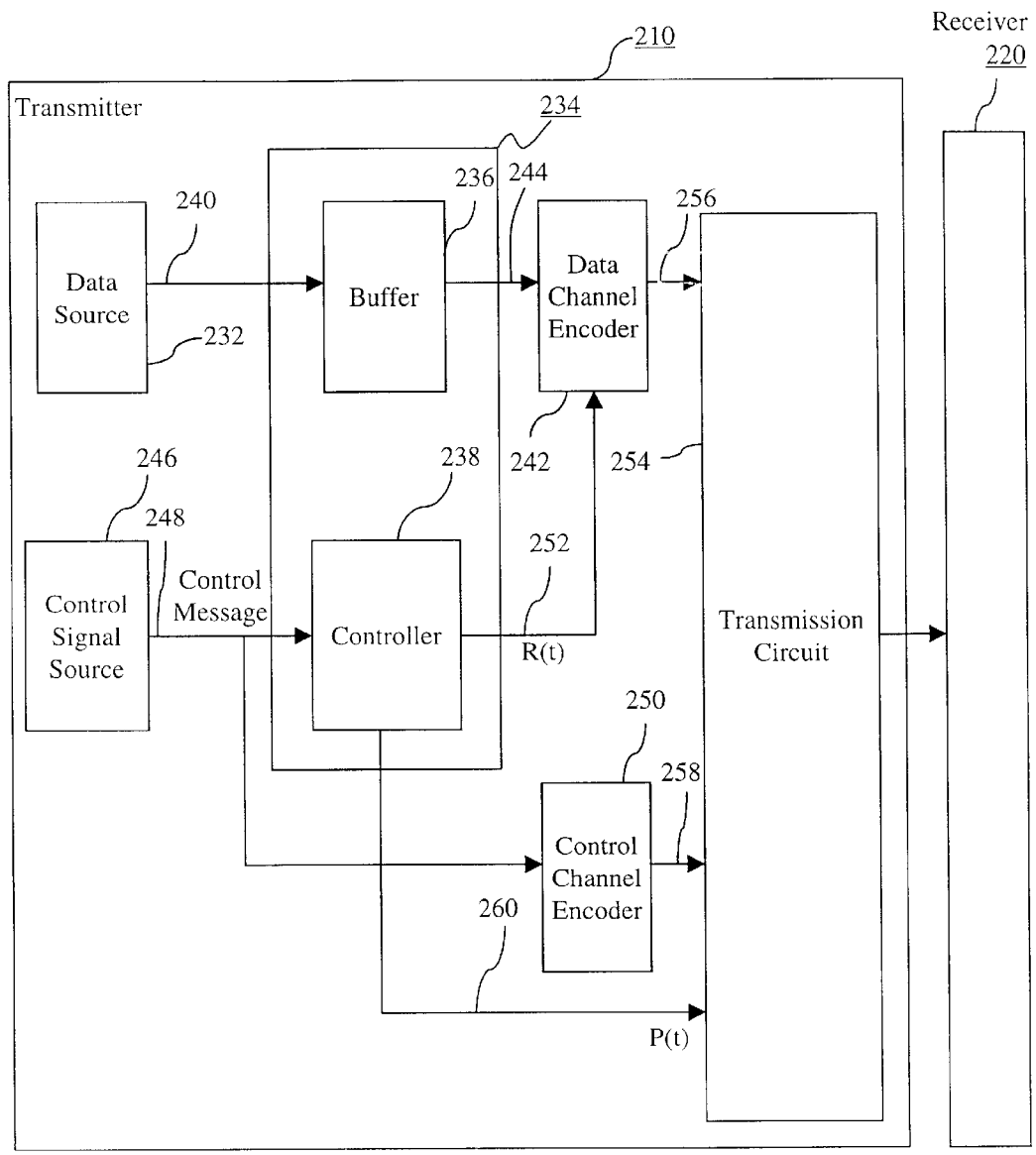
FIG. 2 is a block diagram of a signal transmission system according to an embodiment of the present invention.

FIG. 2 shows a signal transmission system including a transmitter 210 and a receiver 220. In the forward-link scenario as shown in FIG. 1A, the transmitter 210 is part of the base station 110 and the receiver 220 is part of the mobile station 112. In the reverse-link scenario as shown in FIG. 1B, the transmitter 210 is part of the mobile station 120 and the receiver 220 is part of the base station 122. In the reverse-link scenario as shown in FIG. 1C, the transmitter of the mobile station 130 is different from one shown in FIG. 2, because the control signal source 134 is included in the receiver 132.

In FIG. 2, the transmitter 210 includes a data source 232 for producing a digital data stream associated with one or more users. The data source 232 is a vocoder, a portable digital data interface, a computer terminal, a network server or the like. The data stream produced by the data source 232 is typically bursty in nature. A data link 240 carries the bursty data stream to a bit rate control module 234. Not shown are various packetizing and formatting stages which may have to be applied to the bursty data stream between the data source 232 and the bit rate control module 234.

The bit rate control module 234 includes a buffer 236 and a controller 238. The input to the buffer 236 is the bursty data stream received from the data source 232 via the data link 240. The buffer 236 includes circuitry or software for temporarily queueing the bits in the bursty data. The outputs of the buffer 236 are a smoothed data stream fetched by a data channel encoder 242 via another data link 244, at a certain bit rate determined by the controller 238. The buffer 236, the controller 238 and those processing units of the data channel encoder 242 which accept bits from the buffer 236 at a certain rate forced by the controller 238 can be called a data rate smoothing unit.

Figure 3:
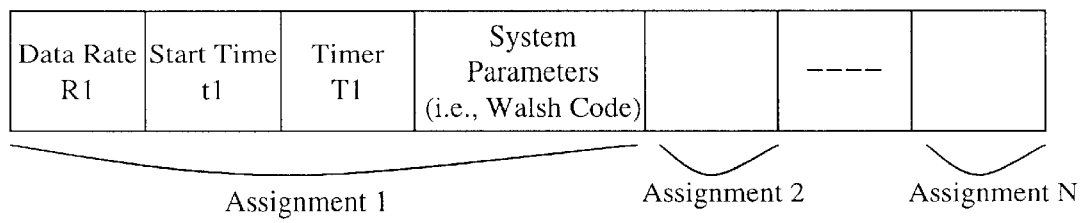
FIG. 3 illustrates a typical control message which is fed to a controller included in the transmitter.

The controller 238 accepts a plurality of system parameters from a control signal source 246 via a control link 248. The typical system parameters fed into the controller 238 are shown in FIG. 3, which depicts a typical control message. The values of the system parameters are sent in one message via a control channel, and are automatically looked up by the control signal source 246 at the start of service delivery.

The controller 238 is preferably a software entity although it can also be implemented as a stand-alone hardware or firmware component, such as an application-specific integrated circuit (ASIC), a programmable logic device (PLD) or a digital signal processor (DSP). Alternatively, the controller 238 may be a general purpose computer capable of reading a storage medium, such as a disk, which contains instructions for controlling the controller 238.

Regardless of the form in which it is implemented, the controller 238 follows a sequence of steps for processing the control message in order to generate a signal indicative of a desired output rate, denoted R(t), and a signal indicative of a desired output power level, denoted P(t). The signal carrying the desired output rate R(t) is fed to the data channel encoder 242 via a control link 252. The control message from the control signal source 246 is fed to a control channel encoder 250 via the control link 248 and transmitted by the transmission circuit 254. The signal carrying the desired output power level P(t) is provided to a transmission circuit 254 via a control link 260.

The data channel encoder 242 is preferably a software entity which may in fact be integrated with the bit rate control module 234. Of course, other implementations in firmware, hardware or software are possible. The data channel encoder 242 is operable to withdraw bits from the buffer 236 according to the desired output rate R(t) received from the controller 238 via the control link 252, resulting in the generation of the smoothed data stream on the data link 244. The data channel encoder 242 also includes functional units for performing error correction encoding of the smoothed data stream so produced. The resulting encoded smoothed data stream is fed to the transmission circuit 254 via a data link 256.

The control channel encoder 250 is also preferably a software entity which may be integrated with the data channel encoder 242 and/or the bit rate control module 234. The control channel encoder 250 encodes the desired output rate R(t) (received from the controller 238 via the control link 252) and provides the encoded value of the desired output rate to the transmission circuit 254 via a data link 258. In this way, an intended recipient can be made aware of instantaneous changes in the bit rate of the smoothed data stream.

The transmission circuit 254 includes circuitry or software for scaling the amplitude of each bit in the encoded smoothed data stream received from the data channel encoder 242 on the data link 256 in accordance with the desired output power level P(t) received from the controller 238 via the control link 260. In addition, the transmission circuit 254 is equipped with circuitry for orthogonally modulating and transmitting both the scaled encoded smoothed data stream and the encoded desired output rate R(t) to the intended recipient across an air interface.

In a forward-link scenario, the transmitter 210 will be part of a base station and there will generally be one buffer, one data channel encoder and one control channel encoder for each of a plurality of mobile units serviced by the base station. The controllers may be distributed or integrated into a centralized unit. In a reverse-link scenario, there will typically be one transmission system per mobile unit, with a single buffer, a single data channel encoder and a single control channel encoder. In either the forward-link or reverse-link scenarios, there may be additional encoders (not shown) connected to the transmission circuit 254 and associated with each data source 232, for supporting extra channels such as pilot, access or paging channels. Furthermore, the data source 232 itself may provide multiplexing of data destined for multiple users sharing a communications link.

In operation, the bursty data stream generated by the data source 232 enters the buffer 236 via the data link 240. Based upon the control message, the controller 238 may or may not change the desired output rate R(t) and the desired output power level P(t). Generation of the desired output rate R(t) as a function of the control message will be considered in greater detail herein below.

Meanwhile, the data channel encoder 242 withdraws bits from the buffer 236 via the data link 244 in accordance with the desired output rate R(t). As will be shown, the resulting data stream processed by the data channel encoder 242 has fewer abrupt transitions than the data stream entering the buffer via the data link 240. The data channel encoder 242 performs error correction encoding of the smoothed data stream and feeds the encoded smooth data stream to the transmission circuit 254 via the data link 256.

Similarly, at the end of the data burst where the data rate decreases sharply, the same method can be applied to smoothen the behaviour of the data stream.

The amount of smoothing applied by the controller 238 and the data channel encoder 242 can be varied by providing a greater or lesser number of gradations of the desired output rate R(t).

Working in parallel with the data channel encoder 242, the control channel encoder 250 encodes the desired output rate R(t), which happens to be the actual data rate being drawn by the data channel encoder 242, into the signal that is fed to the transmission circuit 254 via the data link 256. At the transmission circuit 254, both streams arriving on the data links 256 and 258 are orthogonally modulated and otherwise readied for transmission to the intended recipient in a known way. If other encoders are provided, then their output streams are similarly processed by the transmission circuit 254.

In addition, the transmission circuit 254 applies scaling of the encoded smoothed data stream in accordance with the desired output power level P(t). Typically, the desired output power level P(t) will be proportional to the desired output rate R(t), but scaled to fall within the range required by the transmission circuit 254. Alternatively, the desired output rate R(t) could be provided directly to the transmission circuit 254 instead of a separate desired output power level P(t). In this case, scaling of the encoded smoothed data stream by the transmission circuit 254 would take into account the range of the desired output rate R(t) supplied by the controller 238.

Due to the close relationship between R(t) and P(t), it is sufficient to consider only generation of the desired output rate R(t). The value of R(t) is read from the control message by the controller 238. At any given time, the controller 238 reads the system parameters from the control message, sequentially.

Figure 4A:
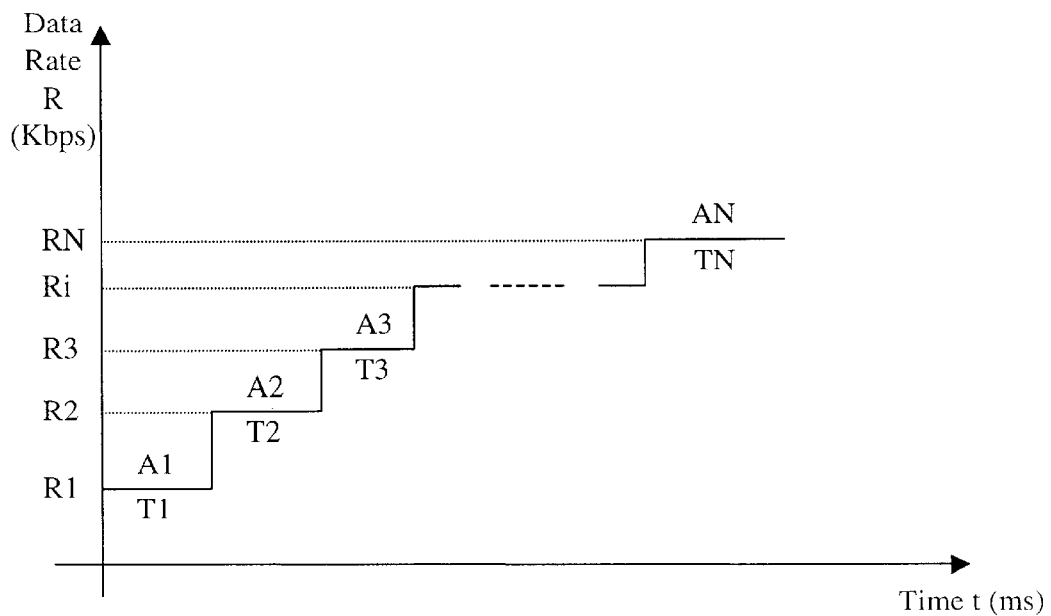
FIGS. 4A and 4B illustrate ramp-up and ramp-down profiles of the control message.
Figure 4B:
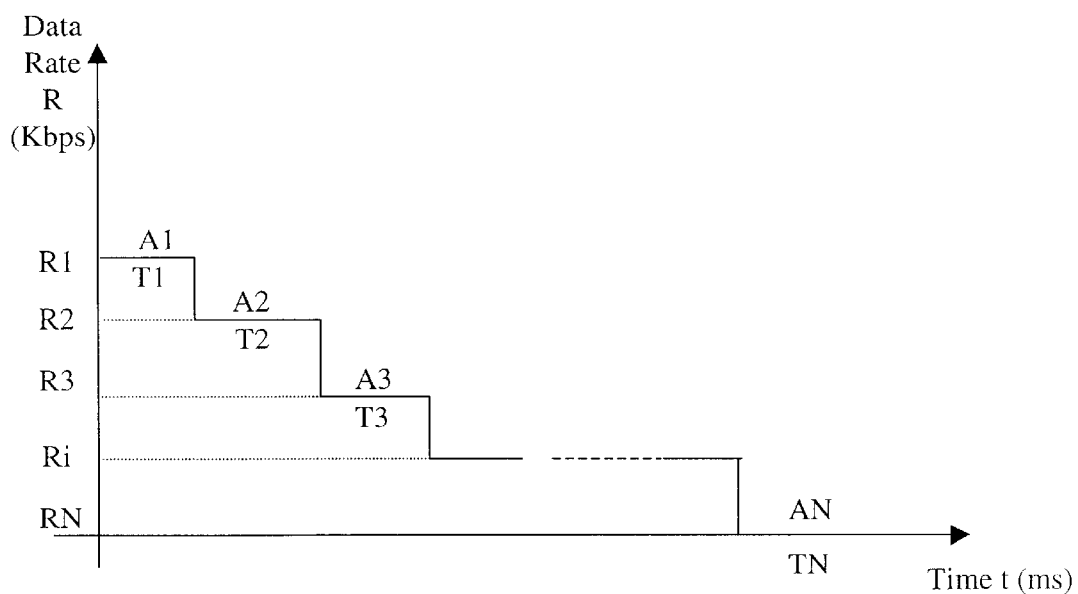

FIG. 3 shows the possible fields of the control message having a sequence of plurality of groups (or assignments). Each of the assignments (A1–AN) has several fields. For example, one assignment, as a group, contains a data rate R (Kbps), a starting time t, a duration T (ms), and corresponding system parameters (i.e., spreading codes or Walsh codes) to that particular data rate. FIGS. 4A and 4B show ramp-up and ramp-down profiles, respectively. A typical example of the final data rate Rf (=RN) is 153 Kbps. These assignment data is transmitted to the receiver 220 through the transmission circuit 254 of the transmitter 210 via the control channel.

The controller 238 in the transmitter 210 processes in response to each of the assignments of the control message.

| Control Message | Controller's Process |
| --- | --- |
| Assignment 1 | In initial state 1, the controller 238 processes in response to data contained in assignment 1, so that the desired output rate R(t) is set to R1 and a timer is started with an expiry time of T1 (ms). State 1 is exited if the timer has expired. |

-continued

| Control Message | Controller's Process |
| --- | --- |
| Assignment 2 | In the next state, the controller 238 processes in response to data contained in assignment 2, so that the desired output rate R(t) is set to R2 and a timer is started with an expiry time of T2 (ms). The state is exited if the timer has expired. |
| Further assignments | The controller 238 goes through different stages based on the number of the assignments in the control message. |
| Assignment N | At the last state where last assignment N is enforced, the data rate remains constant, until a new control message arrives. |

In all the states of the controller 238, other parameters (Walsh codes, transmit power, etc.) are applied to the corresponding system.

Figure 5:
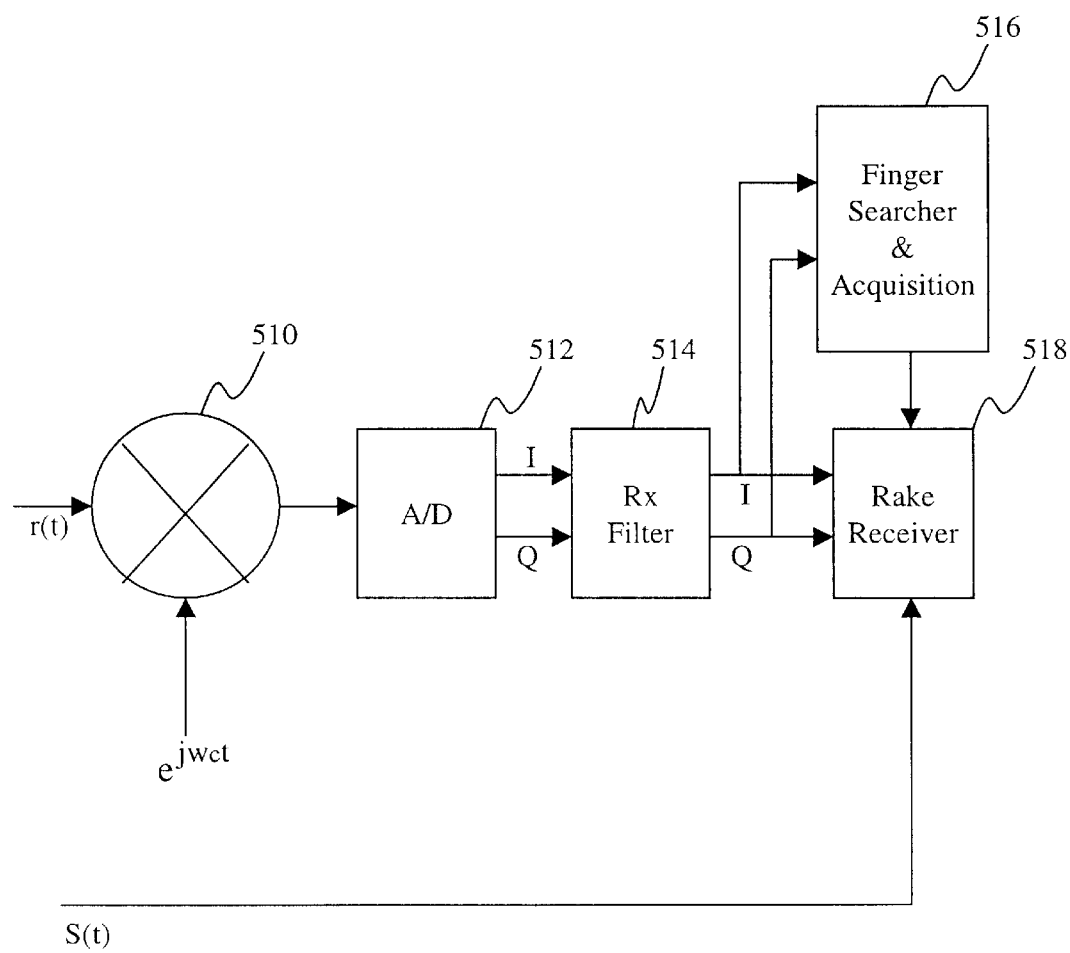
FIG. 5 is a block diagram of a receiver according to an embodiment of the present invention.

FIG. 5 illustrates a part of the receiver 220. In FIG. 5, a complex signal multiplier 510 receives a signal r(t) from the transmitter 210. The output of the multiplier 510 is provided to an analog-to-digital (A/D) converter 512, the output of which is provided to a filter 514. The filtered output is provided to a searcher 516 and a Rake receiver 518 which receives a control signal S(t) from the transmitter 210 shown in FIG. 2 via the control channel.

The searcher 516 recovers synchronization (i.e., timing) and control signals from the spread spectrum data signal. Those timing and control signals are utilized by correlators (not shown) to decode and despread one or more of the data signals received. The received signal r(t) with center frequency $\omega_e = 2\pi f_e$ is converted to a baseband. The received signal is multiplied by $e^{j\omega_e t}$ by the complex signal multiplier 510 and the resulting signal is converted to discrete samples by the A/D converter 512 and then filtered by the receive filter 514 (Rx). The output of the A/D converter contains the samples on both the "I" and "Q" channel. The Rx filter 514 is a complex filter which can thus filter both the I and Q channel samples. The output of the Rx filter 514 is provided to the searcher 516 and the Rake receiver 518. The output of the Rake receiver includes received data samples which may be further processed in an accordance with the conventional practice.

Figure 6:
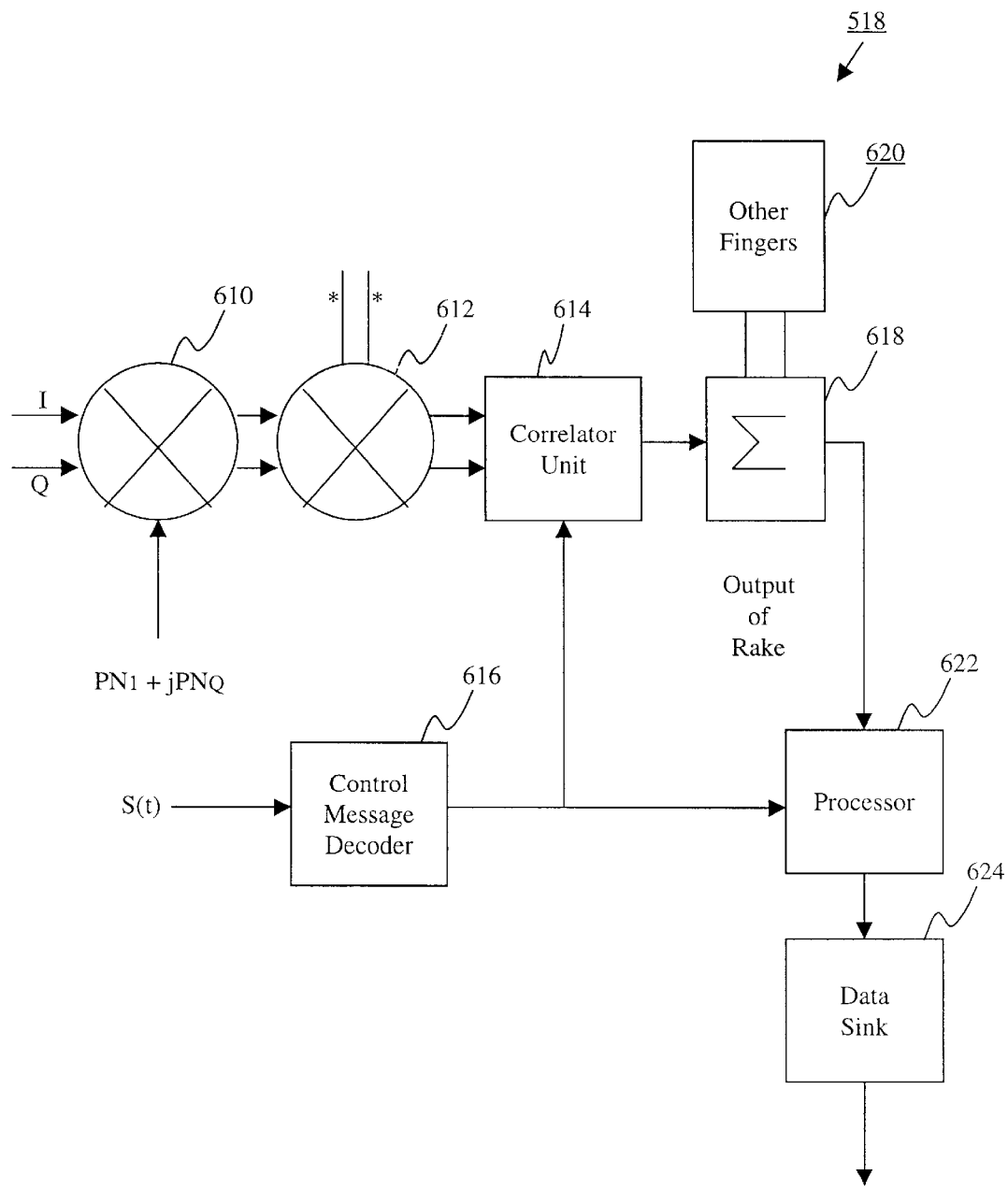
FIG. 6 illustrates an example of a finger of a Rake receiver shown in FIG. 5.

FIG. 6 shows a part of the Rake receiver 518. The Rake receiver 518 can be designed with an arbitrary number of fingers as is known in the art. The receiver 518 includes a complex signal multiplier 610 where the signal is descrambled by the complex PN sequence ($PN_I + jPN_Q$) provided by the searcher 516. The output of the multiplier 610 is a signal which is impaired by the characteristics of the communication channel. To compensate for these characteristics, this output is multiplied in the multiplier 612 by the complex conjugate (represented by *) of a channel estimate produced by the searcher 516. Those skilled in the art will recognize that while the system described relates to coherent receivers, it is also applicable to non-coherent receivers without channel estimation. The output of the multiplier 612 thus constitutes a desired data signal, after correction of the estimated channel impairments.

A control message decoder 616 decodes the control signal S(t) and provides the Walsh code sequence Wi to a correlator unit 614. The unit 614 constitutes a data correlator for the data signal identified by the Walsh code sequence Wi. The Walsh code for each assignment is chosen by the control message decoder 616. The output of the correlator is fed to an accumulator 618 which is also provided with the outputs of other fingers 620. The output of Rake from the accumulator 618 is fed to a processor 622. The control message decoder 616 also controls the clocks of the processor 622 which processes the output of Rake. The processed output of the processor 622 is fed to a data sink 624.

The control messages can be designed in such a way that the data rate at the beginning of each data burst is gradually increased, resulting in smoother behaviour of the data stream withdrawn from the buffer 236 via the data link 244.

Although the described control messages have been applied to the ramp-up and the ramp-down situation herein, their applications is not limited to these examples only.

Other system parameters or internal variables used by the controller 238 may include an identification of the power control algorithm being employed, as well as the minimum power control step size (dp), the rate at which power is controlled (1/dt), the maximum rate at which the data rate can be controlled.

As a result of smoothing the bursty data stream, the desired power level P(t) associated with the bursty service is also smoothed. Hence, there is little degradation of service quality to other users of the system upon establishing the bursty connection and problems related to convergence of power levels across the entire system are practically eliminated. Furthermore, power amplifier requirements in the transmission circuit 254 may be relaxed, which can prevent outages of the high-speed link itself. Also, since there are fewer abrupt changes in the output rate, there will be fewer abrupt changes in the induced interference, leading to a higher percentage of call admissions which are retained and hence capacity is increased.

Figure 7:
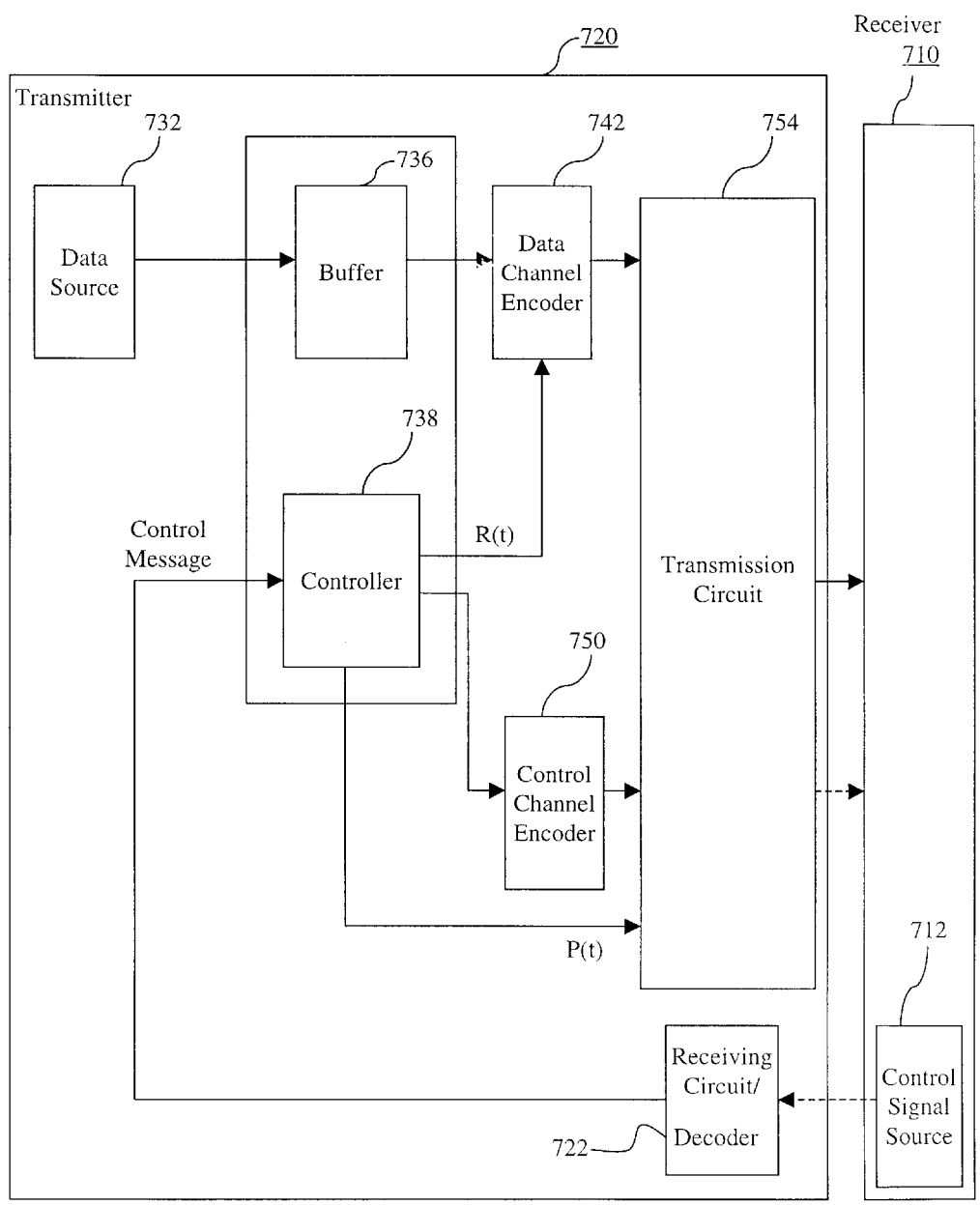
FIG. 7 is a block diagram of a signal transmission system according to another embodiment of the present invention.
Figure 8:
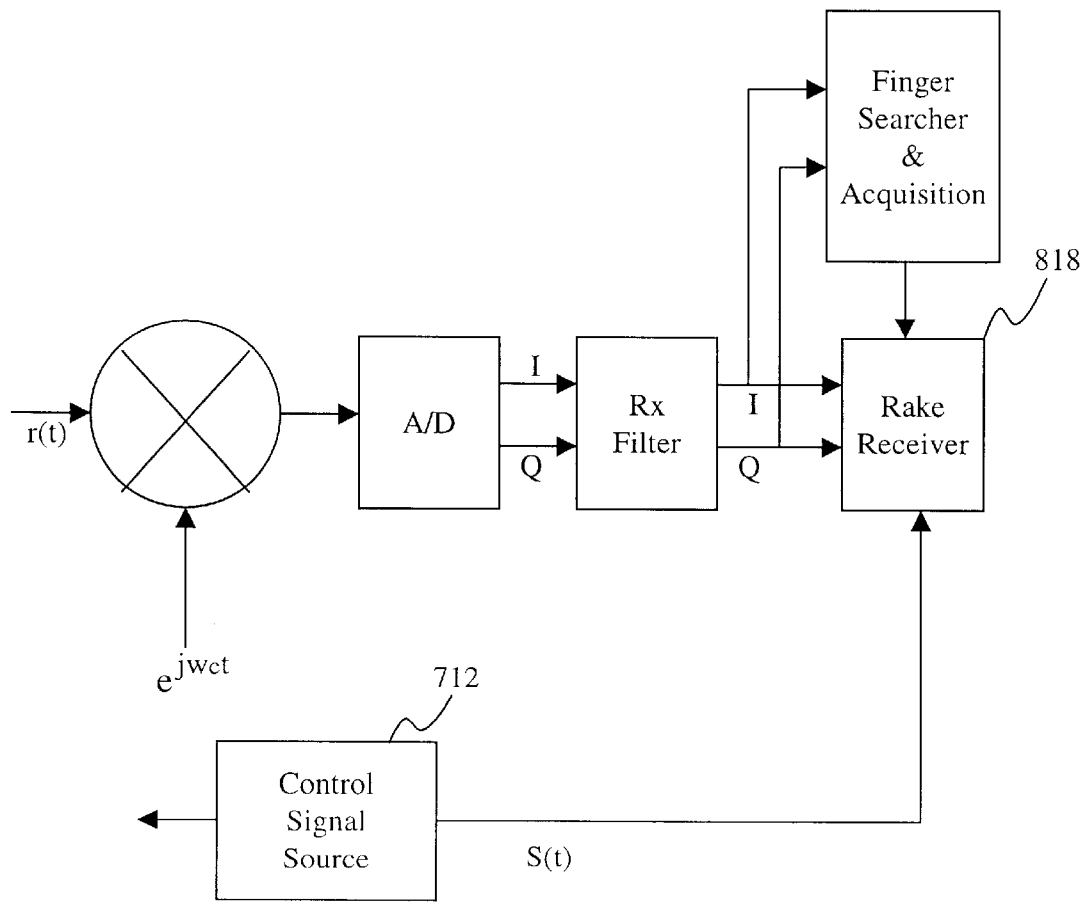
FIG. 8 is a block diagram of a receiver according to another embodiment of the present invention.

FIG. 7 shows a signal transmission system according to another embodiment of the present invention. This arrangement is shown in FIG. 1C (a reverse-link scenario). FIG. 8 shows a receiver. Referring to FIGS. 7 and 8, a controller 738 of a transmitter (or a mobile station) 720 sends rate request associated information to a receiver (or a base station) 710, via a control channel encoder 750 and a transmission circuit 754. In response to the request, the receiver 710 accesses its control signal source 712 and sends the control message of data profiles to the transmitter 720. A receiving circuit/decoder 722 of the receiver 720 provides the control message to the controller 738 which in turn provides the desired output rate R(t) to a data channel encoder 742. A bursty data stream received from a data source 732 is fed to a buffer 736 which temporarily queues the bits in the bursty data. The data channel encoder 742 withdraws bits from the buffer 736 according to the desired output rate R(t), resulting in the generation of the smoothed data stream. The smoothed data is transmitted to the receiver 710 by the transmission circuit 754. The smoothing method is identical to one described above with reference to FIG. 2. In the receiver 710, the control signal source 712 provides a control message to a Rake receiver 818 which operates in the same manner as the Rake receiver 518.

While the embodiment of the present invention has been described and illustrated, it will be apparent to persons skilled in the art that numerous modifications and variations are possible. For example, the control message of FIG. 3 can be modified in various ways while remaining within the scope of the invention. Namely, there may be a different number of fields associated with each data rate R(t) and the transitions themselves need not be restricted to adjacent states.

Furthermore, while it is preferable to send the value of the desired output rate R(t) to the intended recipient over a control channel, it is nevertheless possible to change the data rate at the transmitter without the receiver's knowledge. In such a scenario, which is best suited to a small number (e.g., three or four) of possible output rates, the receiver could perform trellis decoding of all symbol stream possibilities and apply a maximum likelihood decision-making process to the multitude of potential symbol combinations. This incurs an additional delay but may be tolerable, depending on the delay constraints and on the type of service being delivered.

Moreover, although the invention is particularly applicable to CDMA systems, it will be appreciated by those skilled in the art that any interference-limited communications system can benefit from the advantages of the invention as described herein.

Therefore, in view of the many further conceivable variations of the present invention, the scope of the latter is only to be limited by the claims appended hereto.

What is claimed is:

1. A method for multiple assignment signalling for ramp-up and ramp-down of the supplemental channels in the third generation code-division multiplex access (3G CDMA) systems, the ramp-up and ramp-down of the supplemental channels causing the communication power for a cellular wireless communication equipment to ramp-up increase and ramp-down decrease by power change step, the method comprising the step for sequentially providing a plurality of assignments, each assignment comprising a plurality of fields, one of the fields comprising a group of parameter data including a data rate for the communication and another of the field comprising time information in accordance with the power change step.

2. The method of claim 1, wherein the step for sequentially providing a plurality of assignments comprises the step for providing the individual fields comprising different data rates, the data rates ramp-up increasing or ramp-down decreasing by a particular step value corresponding to the power change step.

3. The method of claim 2, wherein the step for sequentially providing a plurality of assignments further comprises the step for providing the individual fields comprising different time information, each of the time information in the field corresponding to the data rate to be changed in that field.

4. The method of claim 3, wherein the step for providing the individual fields comprising different time information comprises the step for providing a duration of time in the individual field, the duration corresponding to the time during the state of the data rate, the date rate being changed after the expiration of the duration in that field.

5. The method of claim 4, wherein the step for providing the individual fields comprising different time information further comprises the step for providing a starting time in the individual field, the starting time corresponding to the time of the state of the data rate being changed in that field.

6. The method of claim 1, wherein the step for sequentially providing a plurality of assignments comprises the step for providing the individual fields comprising communication parameters corresponding to the data rates in those fields.

7. The method of claim 6, wherein the step for providing the individual fields further comprises the step for providing spreading codes or Walsh codes corresponding to the data rates in those fields.

8. A cellular wireless communication equipment for use in a cellular wireless communications network, the cellular wireless communications network transmitting information data at rates of channels in the third generation code-division multiplex access (3G CDMA) systems, the cellular wireless communication equipment comprising a control signal source for multiple assignment signalling for ramp-up and ramp-down of the supplemental channels in the 3G CDMA systems, the ramp-up and ramp-down of the supplemental channels causing the communication power for the cellular wireless communication equipment to ramp-up increase and ramp-down decrease by power change step, the control signal source sequentially providing a plurality of assignments, each assignment comprising a plurality of fields, one of the fields comprising a group of parameter data including a data rate for the communication and another of the fields comprising time information in accordance with the power change step.

9. The cellular wireless communication equipment of claim 8, wherein the control signal source provides the individual fields comprising different data rates, the data rates ramp-up increasing or ramp-down decreasing by a particular step value corresponding to the power change step.

10. The cellular wireless communication equipment of claim 9, wherein the control signal source further provides the individual fields comprising different time information, each of the time information in the field corresponding to the data rate to be changed in that field.

11. The cellular wireless communication equipment of claim 10, wherein the control signal source further provides a duration of time in the individual field, the duration corresponding to the time during the state of the data rate, the date rate being changed after the expiration of the duration in that field.

12. The cellular wireless communication equipment of claim 11, wherein the control signal source further provides a starting time in the individual field, the starting time corresponding to the time of the state of the data rate being changed in that field.

13. The cellular wireless communication equipment of claim 8, wherein the control signal source provides the individual fields comprising communication parameters corresponding to the data rates in those fields.

14. The cellular wireless communication equipment of claim 13, wherein the control signal source provides spreading codes or Walsh codes corresponding to the data rates in those fields.

15. The cellular wireless communication equipment of claim 8, further comprising a transmitter for transmitting the parameter data provided by the control signal source to a receiver included in the cellular wireless communications network.

* * * * *

UNITED STATES PATENT AND TRADEMARK OFFICE
CERTIFICATE OF CORRECTION

PATENT NO. : 6,704,328 B1
DATED : March 9, 2004
INVENTOR(S) : Farideh Khaleghi

It is certified that error appears in the above-identified patent and that said Letters Patent is hereby corrected as shown below:

Column 8,
Line 32, "$\omega_e = 2\pi f_e$" should read -- $\omega_c = 2\pi f_c$ --

Line 33, "$e^{jw_e t}$" should read -- $e^{jw_c t}$ --

Column 10,
Line 47, "the date rate" should read -- the data rate --;

Column 12,
Line 3, "the date rate" should read -- the data rate --.

Signed and Sealed this

Fourth Day of January, 2005

JON W. DUDAS
*Director of the United States Patent and Trademark Office*